3,461,320
BALANCED GATING CIRCUIT FOR
RADAR RECEIVER
Franklin M. Eastland, Linthicum Heights, Md., assignor, by mesne assignments, to the United States of America as represented by the Secretary of the Navy
Filed Dec. 9, 1966, Ser. No. 600,703
Int. Cl. H03k 17/16
U.S. Cl. 307—254                              4 Claims The present invention relates to a balanced gating circuit, and more particularly to a circuit for gating a radar receiver "off" for the purpose of rejecting undesirable signals and "on" for selecting desirable signals.

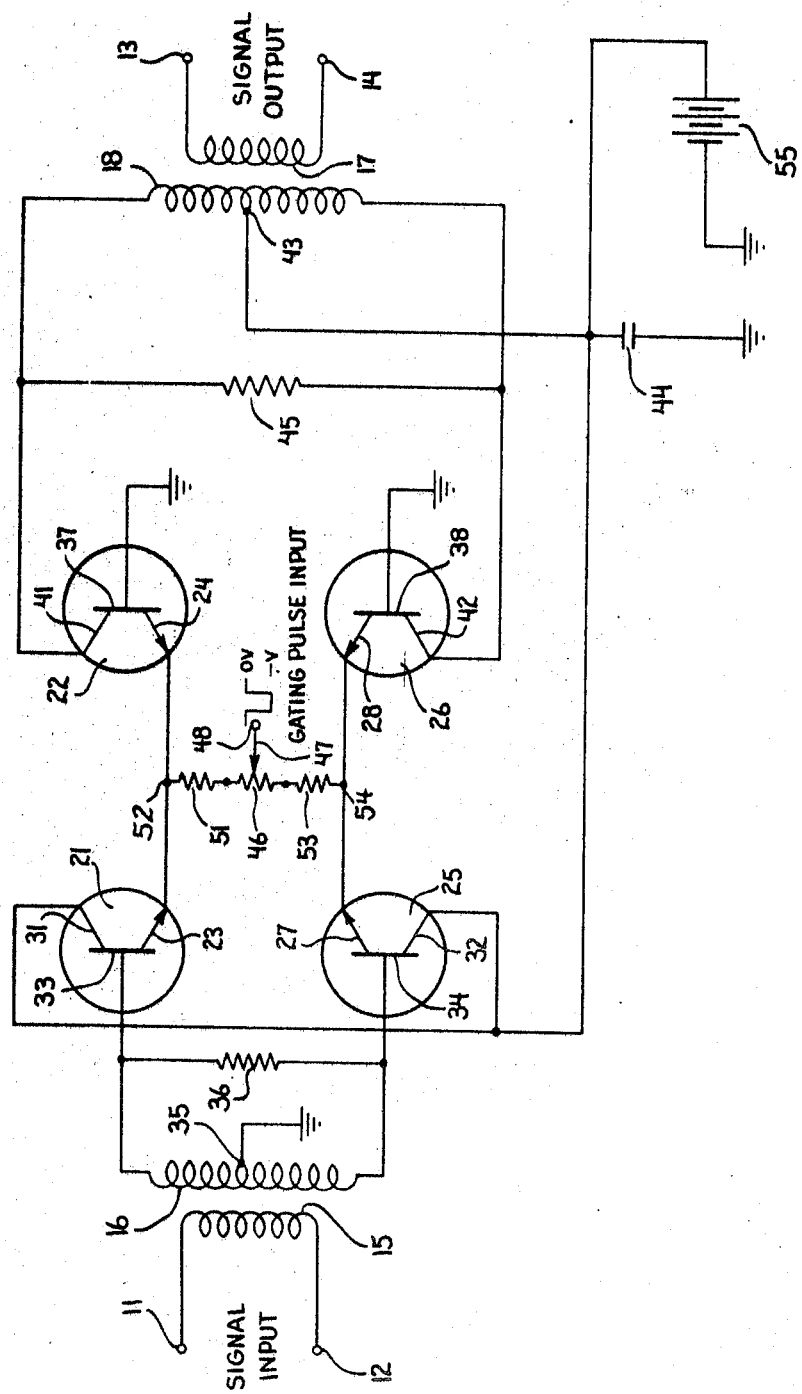
INVENTOR.
FRANKLIN M. EASTLAND
BY H. H. Losche
Paul S. Collignon
Attorney United States Patent Office 3,461,320
Patented Aug. 12, 1969

Various spurious and undesirable signals are picked up by a radar receiver that adversely affect optimum performance, and it is a heretofore known practice to provide gating circuits to eliminate or reject these undesirable signals. For example, one undesirable signal of major importance is a normally large narrow pulse that leaks from the transmitter into the receiving system. In order to properly function in different radar receiver systems, a gating cicuit should provide a high "on" to "off" ratio, should transfer rapidly from one state to another, and should provide minimum transient at the output due to gating action.

Heretofore known gating circuits employed for rejecting undesirable signals had the disadvantage of providing low "on" to "off" ratios and also were difficult to balance. Any unbalance produces large output transients and in order to overcome these, the circuit designers resort to providing matched components and various adjustable devices. As a consequence, these heretofore known gating circuits became expensive and bulky while still providing marginal results.

The present invention provides an improved circuit for gating a radar receiver that provides a high "on" to "off" ratio and very low output transients. The circuit is comprised of four transistors that are connected as two emitter coupled pairs. The coupled pairs are connected in push-pull between first and second transformers thereby coupling an input signal into and out of the gate circuit. A fixed voltage is applied directly to the collectors of one transistor of each pair and via a center tap on the secondary winding of the second transformer to the collectors of the other two transistors. A gating pulse input terminal is provided and is electrically connected to the movable tap of a potentiometer. One end of the potentiometer is electrically connected through a first resistor to a junction point common to the emitters of the first emitter coupled pair of transistors, and the other end of the potentiometer is electrically connected through a second resistor to a junction point common to the emitters of the second emitter coupled pair of transistors. If zero volts are applied between the gating pulse input terminal and ground, the two emitter coupled pairs of transistors will be non-conducting and provide a high impedance path between the first and second transformers. When a negative voltage is applied to the gating pulse input terminal, all transistors will conduct and the normal emitter-coupled gain is provided between the first and second transformer.

It is therefore a general object of the present invention to provide a balanced gating circuit for a radar receiver which will reject undesirable signals.

Another object of the present invention is to provide a gating circuit that will provide a high "on" to "off" ratio.

Other objects and advantages of the present invention will be readily appreciated as the same becomes better understood by reference to the following detailed description when considered in connection with the accompanying drawing which shows a preferred embodiment of the present invention.

Referring now to the drawing, there is shown a gating circuit having a pair of signal input terminals 11 and 12 and a pair of signal output terminals 13 and 14. A first transformer having a primary winding 15 and a secondary winding 16 is provided at the signal input side, with primary winding 15 being connected to input terminals 11 and 12. Likewise, a second transformer having a primary winding 17 and a secondary winding 18 is provided at the signal output side, with primary winding 17 being connected to signal output terminals 13 and 14. Two emitter coupled pairs of transistors are connected in push-pull with the first and second transformers. One pair of transistors 21 and 22 have their emitter electrodes 23 and 24, respectively, connected together, and a second pair of transistors 25 and 26 also have their emitter electrodes 27 and 28, respectively, connected together.

The collector electrode 31 of transistor 21 is connected to the collector electrode 32 of transistor 25, and base electrode 33 of transistor 21 is connected to one end of secondary winding 16 while base electrode 34 of transistor 25 is connected to the other end of secondary winding 16. Secondary winding 16 is provided with a center tap 35 that is connected to ground, and resistor 36 is shunted across secondary winding 16 and functions as a damping resistor. The base electrodes 37 and 38 of transistors 22 and 26, respectively, are connected to ground and the collector electrodes 41 and 42, of transistors 22 and 26, respectively, are connected to the secondary winding 18 of the output transformer. Winding 18 is provided with a center tap 43 which is connected through capacitor 44 to ground. Resistor 45 is shunted across winding 18. Capacitor 44 serves as an IF bypass capacitor while resistor 45 is a damping resistor which, along with resistor 36, determines the circuit bandwidths.

A potentiometer 46 is provided and the adjustable tap 47 is connected to a terminal 48 to which a gating pulse is applied. One end of potentiometer 46 is connected through resistor 51 to a junction point 52 which is common to emitters 23 and 24 of transistors 21 and 22, respectively, and the other end of potentiometer 46 is connected through resistor 53 to a junction point 54 which is common to emitters 27 and 28 of transistors 25 and 26. Potentiometer 46 is provided as a balance adjustment to minimize the transients at the output transformer due to the gating pulse whenever the various circuit components are not adequately balanced. A fixed voltage source 55 is provided and during operation of the gating circuit a voltage is applied directly to collector electrodes 31 and 32 of transistors 21 and 25 respectively, and this voltage is applied via the center tap 43 of winding 18 to collectors 41 and 42 of transistors 22 and 26, respectivey.

In the operation, the gating circiut of the present invention operates in push-pull with the input and output transformers. A fixed voltage from voltage source 55 is applied directly to collector electrodes 31 and 32, and via center tap 43 on winding 18 to collector electrodes 41 and 42. When zero volts are applied between terminal 48 and ground, transistors 21, 22, 25 and 26 will be non-conducting and provide a high impedance path between the input transformer and the output transformer. This is designated as an "off" condition. When, however, a negative voltage is applied between terminal 48 and ground, transistors 21, 22, 25 and 26 will conduct and the normal emitter-coupled pair gain is provided from the input transformer to the output transformer. Since the gating pulse is applied in phase to the emitter electrodes of the two emitter-coupled pairs, the gating pulse will cancel in the output transformer.

A circuit embodying the principles of the present invention was made and tested using NPN transistors as the active devices in the gating circuit. The "on" to "off" ratios obtained were approximately 62 db and the equivalent peak-to-peak transient was less than 150 microvolts with gate rise time of a few nanoseconds. While NPN transistors are shown in the drawing, it should be understood that either PNP transistors or field effect transistors can also be used by appropriately changing the polarity of voltage source 55 and of the gating pulse.

It should be understood, of course, that many modifications and variations of the present invention are possible in the light of the above teachings. It is therefore to be understood, that within the scope of the appended claims, the invention may be practiced otherwise than as specifically described.

What is claimed is:

1. A balanced gating circuit comprising:
   an input transformer and an output transformer each having a primary winding and a center-tapped second-tapped secondary winding,
   first and second transistors each having base, collector, and emitter electrodes, said emitter electrodes being connected together, said base electrode of said first transistor being connected to one end of said secondary winding of said input transformer, said base electrode of said second transistor being connected to ground potential and said collector electrode of said second transistor being connected to one end of said secondary winding of said output transformer,
   third and fourth transistors each having base, collector, and emitter electrodes, said emitter electrodes of said third and fourth transistors being connected together, said base electrode of said third transistor being connected to the other end of said secondary winding of said input transformer, said base electrode of said fourth transistor being connected to ground potential and said collector electrode of said fourth transistor being connected to the other end of said secondary winding of said output transformer,
   a source of voltage,
   means connecting said source of voltage directly to said collector electrodes of said first and third transistors and to the center tap of said secondary winding of said output transformer,
   means for applying a gating pulse simultaneously to the emitters of said first, second, third, and fourth transistors, and
   balancing means connected to said emitters of said first, second, third, and fourth transistors for minimizing transients at said output transformer.

2. A balanced gating circuit as set forth in claim 1 wherein said first, second, third, and fourth transistors are of the same conductivity type.

3. A balanced gating circuit as set forth in claim 1 wherein said balancing means includes a potentiometer having one end connected through a first resistor to a junction point common to the emitters of said first and second transistors and having the other end connected through a second resistor to a junction point common to the emitters of said third and fourth transistors.

4. A balanced gating circuit as set forth in claim 1 wherein a damping resistor is shunted across each said secondary winding.

References Cited

UNITED STATES PATENTS

| | | | |
|---|---|---|---|
| 2,816,238 | 12/1957 | Elliott | 307—250 X |
| 3,040,269 | 6/1962 | Hemphill et al. | 330—15 X |

DONALD D. FORRER, Primary Examiner

U.S. Cl. X.R.

328—101; 330—15; 332—43